United States Patent [19]
Jacobson

[11] 3,787,862
[45] Jan. 22, 1974

[54] RADIO DIRECTION FINDER SYSTEM
[75] Inventor: Robert S. Jacobson, Phoenix, Ariz.
[73] Assignee: Sperry Rand Corporation, New York, N.Y.
[22] Filed: Sept. 27, 1971
[21] Appl. No.: 183,934

[52] U.S. Cl.................. 343/113 DE, 343/113 R
[51] Int. Cl............................................. G01s 5/02
[58] Field of Search.... 340/27; 343/113 R, 113 DE; 235/150.27

[56] References Cited
UNITED STATES PATENTS
| 3,550,130 | 12/1970 | Shaw | 343/113 DE |
| 2,860,336 | 11/1958 | Earp et al. | 343/113 DE |
| 3,075,190 | 1/1963 | Laporte | 235/150.27 X |
| 3,453,624 | 6/1969 | Rockey | 235/150.27 X |
| 3,246,331 | 4/1966 | Royal | 343/113 R |

FOREIGN PATENTS OR APPLICATIONS
1,254,204   11/1967   Germany.................. 343/113 DE Primary Examiner—Benjamin A. Borchelt
Assistant Examiner—S. C. Buczinski
Attorney, Agent, or Firm—S. C. Yeaton; Howard P. Terry

[57] ABSTRACT

A radio direction finder system incorporating relatively small antennas is provided with a signal processing arrangement for artificially synthesizing variably shaped high frequency direction finding antenna receptivity patterns useful in a first mode for searching for the general location of a broadcasting high frequency transmitter and in a second mode for precisely tracking such a transmitter for navigation purposes.

30 Claims, 20 Drawing Figures

PATENTED JAN 22 1974
3,787,862
SHEET 1 OF 7
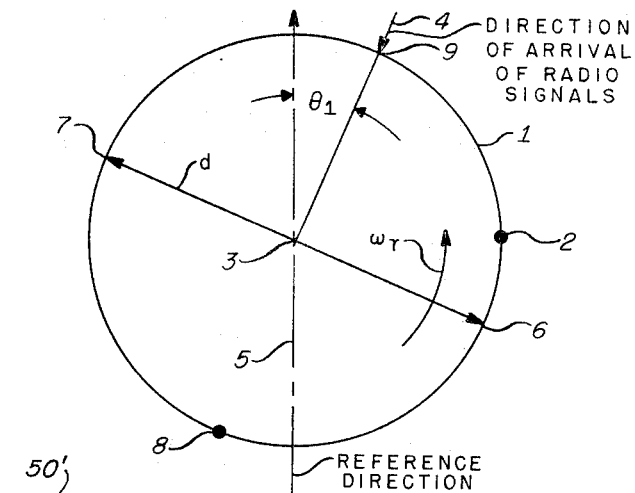
FIG.1.
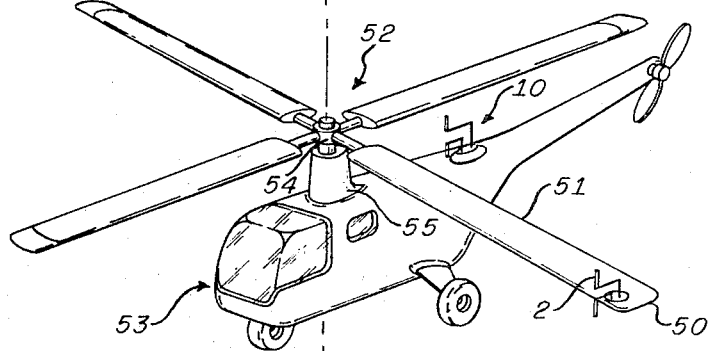
FIG.3.
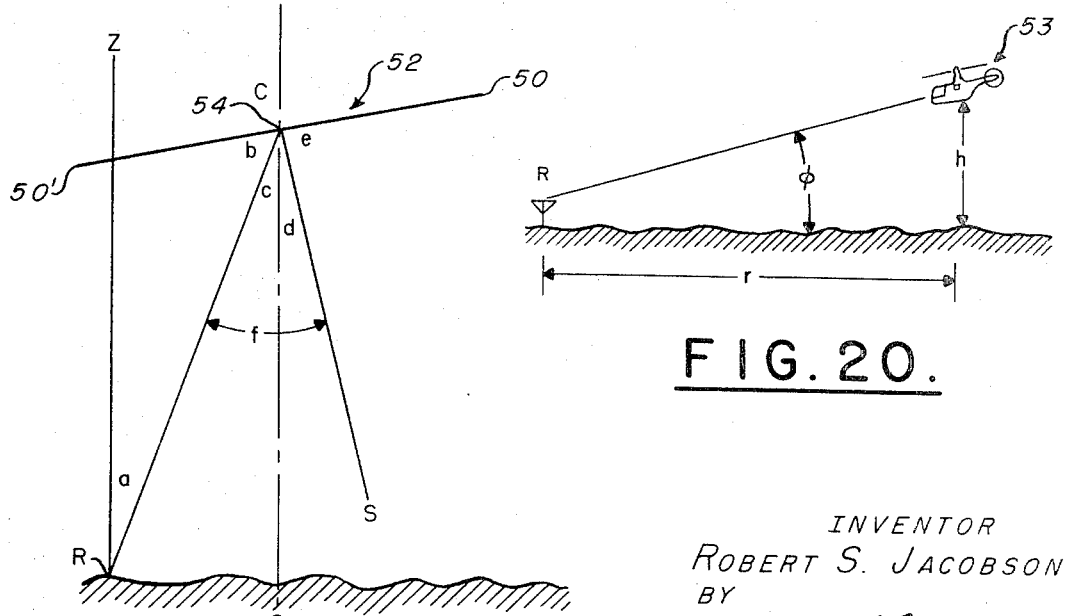
FIG.20.
FIG.19.
INVENTOR
ROBERT S. JACOBSON
BY
*H P Terry*
ATTORNEY

FIG. 4.
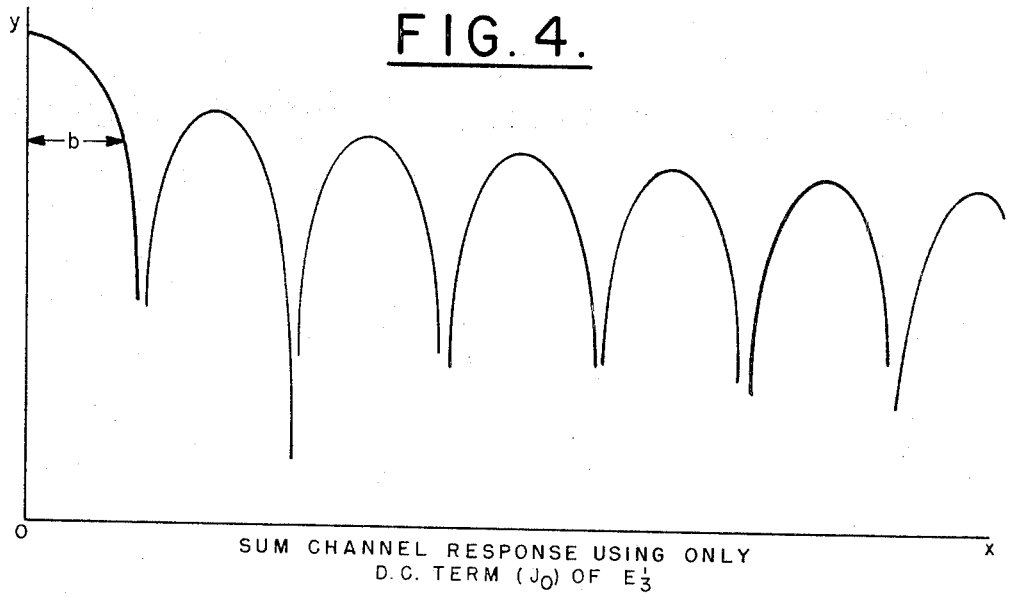
SUM CHANNEL RESPONSE USING ONLY
D.C. TERM ($J_0$) OF $E_3'$
FIG. 5.
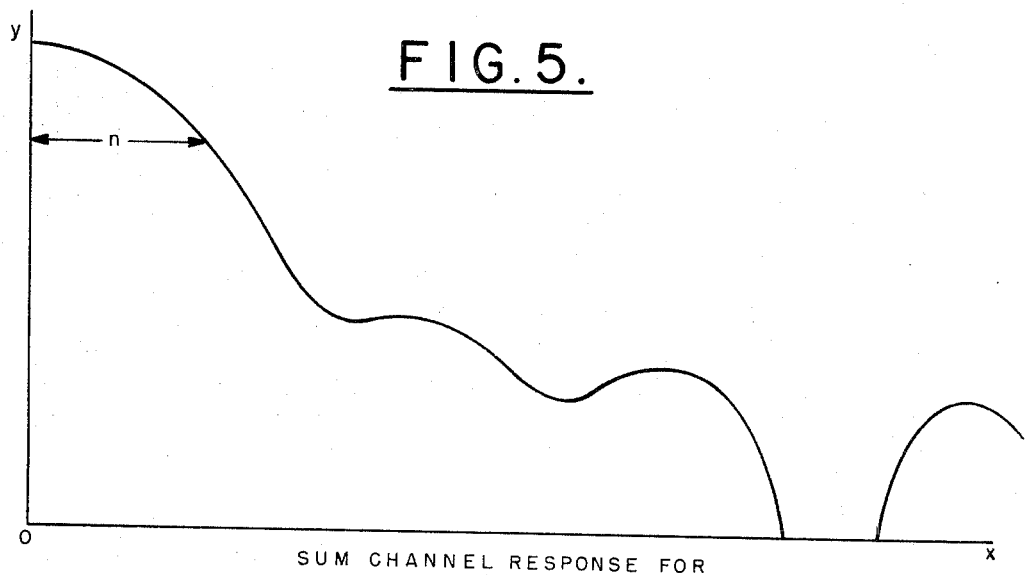
SUM CHANNEL RESPONSE FOR
$E_3' = J_0(X) + \frac{4}{3} J_2(X) + \frac{1}{2} J_4(X) +$
$\frac{16}{3} \left[ \frac{J_6(X)}{36} + \cdots + \frac{J_n(X)}{n^2} \right]$
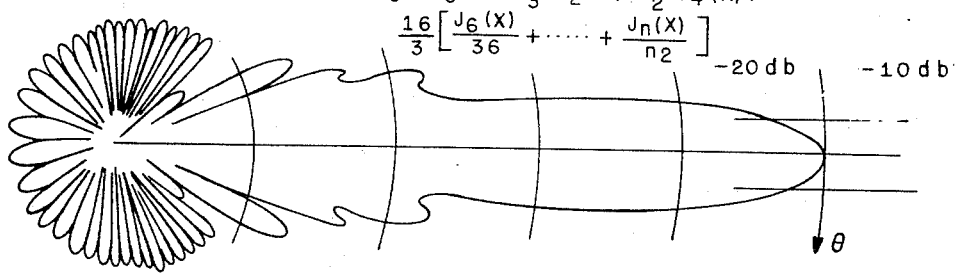
SUM CHANNEL RESPONSE
AS IN FIGURE 5
FIG. 6.

DIFFERENCE CHANNEL RESPONSE
USING FUNDAMENTAL TERM ONLY

DIFFERENCE CHANNEL RESPONSE FOR
$E_5' = J_1(X) + \frac{4}{3} J_3(X) + \frac{3}{5} J_5(X) + \left[ \frac{J_7(X)}{7} + \cdots + \frac{J_n(X)}{n} \right]$

DIFFERENCE
CHANNEL RESPONSE
AS IN FIG. 8

INVENTOR
ROBERT S. JACOBSON
BY
*HP Terry*
ATTORNEY

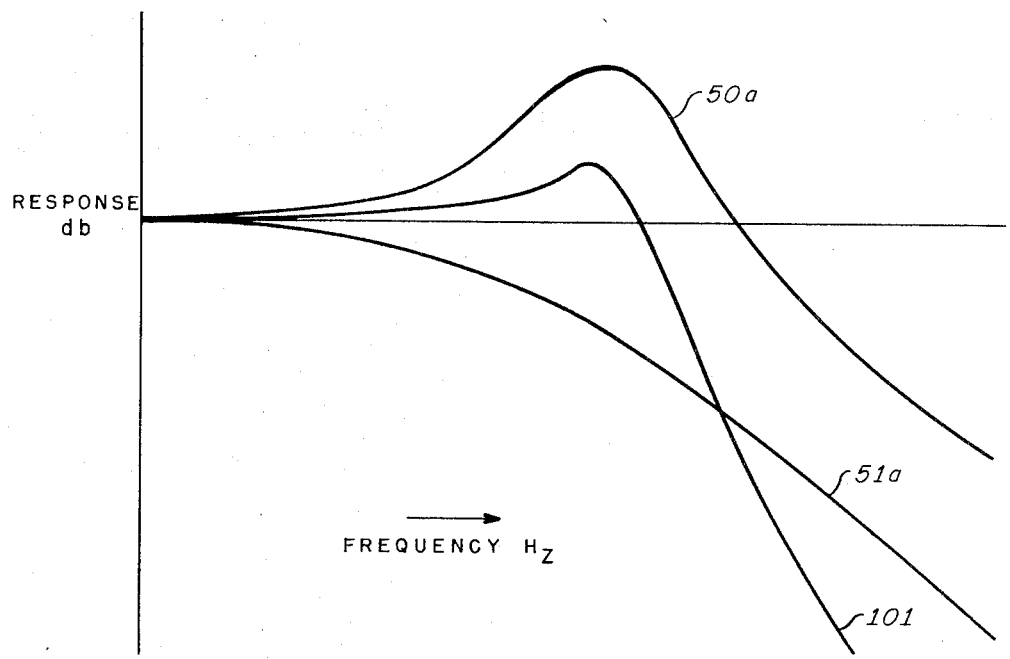
FIG.11.
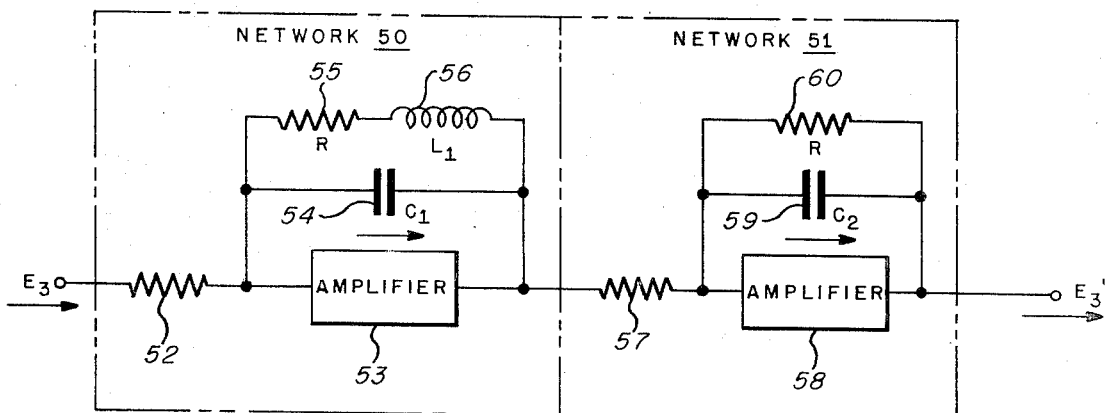
FIG.12.
FIG.10.
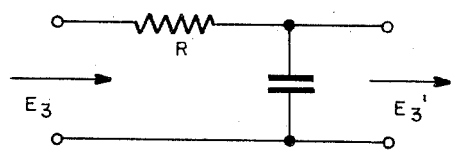
INVENTOR
ROBERT S. JACOBSON
BY
*H.P. Terry*
ATTORNEY

INVENTOR
ROBERT S. JACOBSON
BY
ATTORNEY

INVENTOR
ROBERT S. JACOBSON
BY
H.P. Terry
ATTORNEY

RADIO DIRECTION FINDER SYSTEM

BACKGROUND OF THE INVENTION

1. Field of the Invention

The invention pertains to the art of accurate radio navigation or guidance of a mobile craft with respect to a broadcasting high frequency transmitter and more particularly pertains to radio receiver systems of the wide aperture Doppler kind for providing measures of craft azimuth, elevation, and range with respect to such a broadcasting transmitter.

2. Description of the Prior Art

Prior art Doppler radio direction finding systems generally advantageously make use of basic properties of propagating radio waves whereby a radio signal incident upon a direction finder antenna cyclically moving actually or in effect in a circular path is phase or frequency modulated as a function of the effective angular velocity of the antenna and of the respective bearing of the radio signal source. The direction finder receiver derives an output signal by employing phase comparison circuits, thus providing a measure of the bearing of the incident radio wave.

Such systems include those in which the antenna is physically moved in a circle and also the quasi-Doppler kind of system in which the antenna consists of a circular array of stationary antenna elements. In the latter, the elements are sequentially connected to the receiver by mechanical or electronic switching means. The effective point of reception of the incident radio wave is thus again moved in a circle, just as in the instance of the physically revolved antenna, and the same type of information-bearing phase or frequency modulation is imposed upon the incoming signal.

In both types of Doppler direction finder systems, a phase reference signal is generated at the receiver according to the effective angular velocity and instantaneous position of the revolving antenna. The relative phase of the detected phase modulation derived in the receiver from the incident radio wave compared with the corresponding instantaneous position of the revolving antenna is a measure of the bearing of the incident carrier wave and therefore the azimuth direction of the braodcasting transmitter originating the incident radio wave.

While such antenna configurations have been used in the prior art with some success for direction finding purposes because they permit a relatively small antenna element or elements to provide an approximation to the directivity of a much larger and undesirably cumbersome antenna, they do not afford theoretical perfection by yielding ideally narrow beam directivity and are troubled by the presence of numerous radiation pattern side lobes of significant magnitude. Furthermore, the systems of the prior art generally represent compromise solutions of necessity not optimum in design under various operation circumstances, as for searching for a broadcasting transmitter and then for precisely tracking the transmitter once generally located. The effective antenna receptivity patterns are permanently fixed, and are not susceptible of adjustment according to the needs of such desired modes of operation. Generally, prior art direction finder concepts also lack one or more of the following desirable features: high angular accuracy and discrimination, simultaneous measurement of both azimuth and elevation directions of the incident radio wave, freedom from antenna siting effects, stable and consistent operation over a relatively wide band of the radio frequency spectrum, and relative freedom from effects due to transmitter signal modulation and frequency instabilities.

SUMMARY OF THE INVENTION

The invention is a radio direction finding system of the wide aperture Doppler type for locating the azimuth and elevation directions of a broadcasting radio transmitter by employing relatively small receiver antenna elements and by employing a novel system for processing the signals received by those antenna elements, thus providing enhanced accuracy of determination of the angles of arrival of the radio signals. The invention may alternatively beneficially employ signals derived by a quasi Doppler type of direction finder system for the same purpose.

The novel signal processing arrangement embodies adjustable or predetermined filter network means and permits the effective synthesis of various direction finder receptivity patterns in the form of sum or difference patterns particularly adapted for use according to desired search or track modes of operation of the direction finder system. Diminution of undesired side lobe levels in the synthesized receptivity patterns, as well as precise shaping of the desired lobe or lobes of the pattern, is achieved under the control of the operator according to the mission to be performed by selective operation of elements of the filter network system.

BRIEF DESCRIPTION OF THE DRAWINGS

FIG. 1 is a diagrammatic plan view useful in explaining the operation of the invention.

FIG. 3 is a perspective view of an aircraft illustrating a possible location of the direction finder antennas.

FIGS. 4 to 9 are graphs useful in explaining the operation of the invention.

FIG. 10 is a circuit diagram of a filter for use in the system of FIG. 2.

FIG. 11 is a graph showing desired characteristics of an alternative filter.

FIG. 12 is a circuit diagram of a sum channel filter for use in the system of FIG. 2.

FIGS. 19 and 20 are diagrams useful in explaining the operation of the apparatus of FIG 18.

DESCRIPTION OF THE PREFERRED EMBODIMENTS

Figure 2:
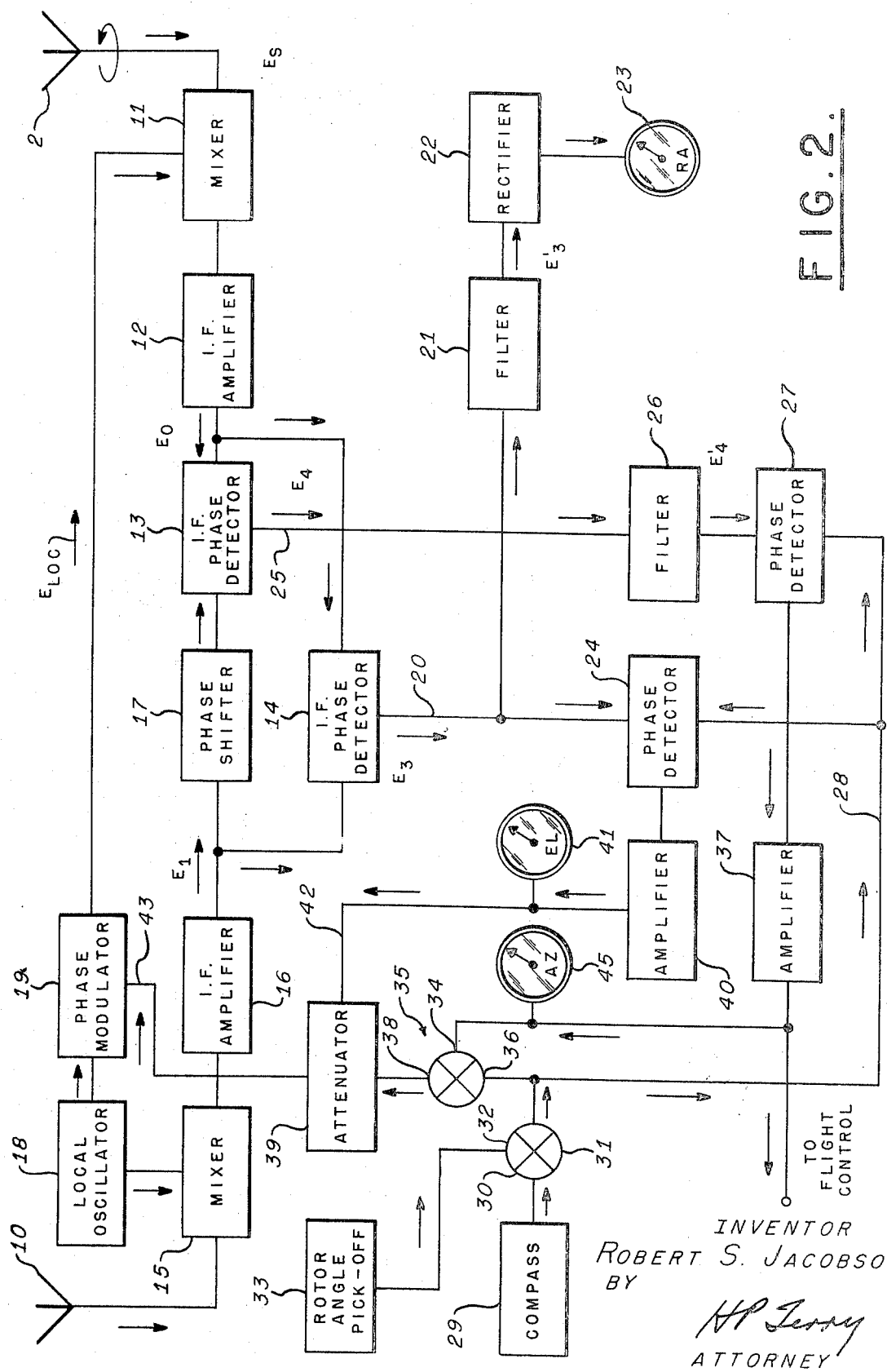
FIG. 2 is a block diagram of the direction finder system showing its principal components and their interconnections.

The novel radio direction finding system contemplates the use of an arrangement for artificially synthesizing high frequency direction finding antenna receptivity patterns having effective beam widths and side lobe characteristics approaching those theoretically possible with conventional antennas having corresponding larger physical size. Generation of the synthetic aperture required to form the desired radiation pattern is accomplished, for example, by fixing a first single simple omnidirectional antenna at the periphery of a spinning rotor and by employing a second simple omnidirectional antenna in a fixed location relative to the axis of the rotor. While the invention is not limited to use in the particular environment, it will be seen that the rotor may be, for example, the sustaining rotor of a helicopter, the first antenna being mounted on the helicopter rotor, for example, at one of the rotor blade tips. The second or reference antenna may be mounted on the fuselage of the helicopter in fixed relation thereon, spaced with respect to the helicopter rotor axis. The novel direction finding system may be used to locate a transmitter located at a ground level station, for example.

The geometry of the situation is illustrated in FIG. 1. The circle 1 represents the locus or circular path of the spinning antenna 2 as it rotates about axis 3 of the rotor with an angular velocity $\omega_r$. The diameter $d$ of circle 1 may be substantially that of the rotor employed. In a general situation, the direction of arrival of high frequency or other radio signals may be indicated by line 4 which intersects circle 1 and passes through axis 3. Line 5, which also passes through axis 3, represents a reference direction which may arbitrarily be chosen as the air craft or vehicle longitudinal axis or alternatively the direction of magnetic north, for instance. In general, there is a finite angular separation $\theta_1$ between the directions of lines 4 and 5.

Still referring to FIG. 1, it is observed that the signal seen by antenna 2 undergoes a Doppler shift depending upon the angular velocity $\omega_r$ of the rotor, the rotor diameter d, and the wave length $\lambda$ and angle $\theta_1$ of arrival of the radio signals with reference to line 5. If v is the lineal velocity of the tip of the rotor blade:

$$v = \omega_r\, d/2 \tag{1}$$

Also, the maximum Doppler shift $\Delta f_{max}$ is:

$$\Delta f_{max} = v/\lambda \tag{2}$$

Maximum Doppler shift is expected in the situation of FIG. 1 when antenna 2 passes locations 6 and 7; zero frequency shift obtains at locations 8 and 9. It is also readily understood that the modulation index m of the signal received by antenna 2 is:

$$m = \Delta f_{max}/\omega_r/2\pi \tag{3}$$

or $$m = \pi d/\lambda \tag{4}$$

The modulation index $m$ is thus seen to be a function only of rotor diameter d and of the wave length $\lambda$, but not of rotor speed $\omega_r$. For the case of a helicopter of typical characteristics, a modulation index $m$ of the order of 42 is readily achieved for signals of wave length $\lambda$ equal to three feet and d equal to 40 feet.

FIG. 2 illustrates the omnidirectional antenna 2 for mounting at the rotor periphery and the reference or fixed omnidirectional antenna 10 in relation to the apparatus used to process signals received by the antennas 2 and 10. While simple omnidirectional antennas are a natural choice for use in the system, it will be understood that the system will operate successfully with other kinds of antennas. The characteristics of antennas 2 and 10 do not need to be closely controlled since, as will be seen, the system operates according to frequency modulation principles, and amplitude modulation effects are therefore generally of secondary importance.

As seen in FIG. 3, antenna 2 may be located near the tip 50 of one blade 51 of the rotor 52 of a helicopter 53. The antennas 2 and 10 in FIG. 3 are shown for clarity in simple form and without the presence of radomes or other aerodynamic support structures which may readily be supplied using well established antenna design techniques. The signals collected by antenna 2 may be supplied via a coaxial cable (not shown) located within the hollow rotor blade 51 and running from antenna 2 through the hub 54 of rotor 52. A suitable conventional shielded slip ring system (not shown) within the rotor support 55 may be used to take the incoming radio signals off of the rotor system, whence they may be fed directly to a first mixer 11 of FIG. 2. Antenna 10 may be located in a fixed position extending from the top of the fuselage, or may be placed in other locations, such as extending below the fuselage of the vehicle. Antenna 10 may be directly connected to a second mixer 15 as in FIG. 2 by a conventional coaxial or other transmission line.

The signals collected by rotor antenna 2 are supplied to successive conventional mixer and intermediate frequency amplifier stages 11 and 12, respectively, for supply of an output directly to first inputs of quadrature intermediate frequency phase detectors 13 and 14. The signals collected by fixed or reference antenna 10 are similarly supplied to successive conventional mixer and intermediate frequency amplifier stages 15 and 16, respectively, for supply of an output to second inputs of the same quadrature intermediate frequency phase detector circuits 13 and 14. For this purpose, 90° phase shifter 17 is used to shift the signal arising in mixer 15 by 90° before application to phase detector 13, while the unmodified signal is connected directly to the second input of phase detector 14. Operation of mixers 11 and 15 is enabled by the supply of local oscillator signals from the common local oscillator source 18 to both of the mixers 11 and 15. However, the local oscillator signal to be supplied to mixer 11 is first subjected to phase modulation in phase modulator 19 for purposes yet to be explained.

Phase detector circuit 14 has an audio output lead 20 coupled through filter 21 and rectifier 22 to supply an actuating signal to utilization device 23, which may be an indicator or display device. The audio output lead 20 is also coupled to a first input of audio phase detector circuit 24, while the output lead 25 of phase detector 13 is coupled through filter 26 to a first input of audio phase detector 27. Phase detectors 24 and 27 are supplied by the common lead 28 with second audio input signals.

For purposes of stabilization, an inertial or other reference such as a magnetic flux valve compass 29 is used to drive one input 30 of a first mechanical or electrical differential or algebraic adder 31, whose other input 32 is supplied with the output $\theta_1$ of a rotor blade angle pick off 33. Compass 29 may be omitted and input 30 simply fixed to represent the position of the longitudinal axis of the craft, if desired. The output of differential 31, in any event, is an electrical voltage representing instantaneous rotor position with respect to the reference value supplied at input 30, and is supplied by lead 28 to phase detectors 24 and 27.

Phase detector 27 supplies an output to one input 34 of a second mechanical or electrical differential device 35, which output signal may be amplified before such use by amplifier 37, if desired and, in any event, is supplied to utilization device 45, which may be an angle display meter or the azimuth channel of a flight controller. The second input 36 of differential device 35 is supplied with the output of the first differential 31. An electrical signal representing the signal found at the output of differential device 35 is supplied for passage through attenuator 39.

The output of phase detector 24, after amplification if desired by amplifier 40, is fed to a utilization device 41, which may be an angular display device as will be explained. The output of amplifier 40 is also coupled via lead 42 to attenuator 39. Attenuator 39 may take any one of several well known forms. For example, the electrical signal on lead 42 may be used to control the effect of a conventional electronic attenuator device. The signal on lead 42 may alternatively be used to drive a motor for positioning a tap of a variable resistor having a stable voltage drop thereacross. A closed loop positional control may thus be used to operate attenuator 39 in the conventional manner. In any event, the variably attenuated electrical output of control device 39 is supplied by lead 43 to control the phase modulator 19 for the purpose of supplying a variably phase modulated local oscillator signal to mixer 11. The phase modulation of the local oscillator signal is then in phase with the phase $\theta_1$ of the rotor position (the position of helicopter rotor blade 51). It is to be observed that the local oscillator signal supplied to mixer 15 remains unmodulated.

The arriving radio signals are collected by the rotor antenna 2 and the fixed or reference antenna 10 and are caused to generate respective corresponding intermediate frequency signals $E_0$ and $E_1$ at the respective outputs of intermediate frequency amplifiers 12 and 16. Signals $E_0$ and $E_1$ are stable with respect to relative frequency, since local oscillator 18 is used in common in their generation. The originally received signal $E_s$ collected by the rotor antenna 2 is seen to be:

$$E_s = \cos [\omega_c t + m \cos (\omega_r t + \theta_1)] \quad (5)$$

where $t$ is time and $\omega_c$ is the radian carrier frequency. As previously noted, a local oscillator signal $E_{loc}$ is generated, which, after the phase modulation event may be expressed as:

$$E_{loc} = \cos [\omega_{loc} t + m \cos (\omega_r t)] \quad (6)$$

With the signals of equations 5 and 6 subjected to the action of mixer 11, and after discarding terms representing signals of frequency not passed by intermediate frequency amplifier 12, the signal $E_0$ fed to the first inputs of phase detectors 13, 14 is:

$$E_0 = \cos [\omega_s t - 2m \sin \theta_1/2 \sin [\omega_r t + \theta_1/2]] \quad (7)$$

In equation 7:

$$\omega_s = \omega_c - \omega_{loc}$$

where $\omega_s$ is the intermediate frequency of amplifier 12.

The quadrature intermediate frequency phase detector circuits 13, 14 serve the purpose of comparing signals $E_0$ and $E_1$ which latter signal may be regarded as a reference intermediate signal and which is expressed by:

$$E_1 = \cos (\omega_s t) \quad (8)$$

The outputs of intermediate frequency phase detectors 13, 14 must be equal to the peak value of $E_0$ multiplied by the sine or cosine of the difference in phase of signals $E_0$ and $E_1$. Assuming that intermediate frequency amplifiers 12 and 16 contain conventional limiter circuits, signal $E_4$ appears at the output 25 of intermediate frequency phase detector 13 and signal $E_3$ appears at the output 20 of intermediate frequency phase detector circuit 14, signals $E_3$ and $E_4$ being expressed as follows:

$$E_3 = \cos [2m \sin \theta_1/2 \sin [\omega_r t + \theta_1/2]] \quad (9)$$

$$E_4 = \sin [2m \sin \theta_1/2 \sin [\omega_r t + \theta_1/2]] \quad (10)$$

Each of these equations can now be expanded by virtue of the following Bessel function identities:

$$\cos (x \sin z) \equiv J_0(x) + 2 \sum_{n=1}^{\infty} J_{2n}(x) \cos (2nz) \quad (11)$$

and:

$$\sin (x \sin z) \equiv 2 \sum_{n=1}^{\infty} J_{2n-1}(x) \sin [(2n-1)z] \quad (12)$$

The expansion yields:

$$E_3 = J_0\left(2m \sin \frac{\theta_1}{2}\right) + 2 \sum_{n=1}^{\infty} J_{2n}\left(2m \sin \frac{\theta_1}{2}\right) \cos \left[2n\left(\omega_r t + \frac{\theta_1}{2}\right)\right] \quad (13)$$

and:

$$E_4 = 2 \sum_{n=1}^{\infty} J_{2n-1}\left(2m \sin \frac{\theta_1}{2}\right) \sin \left[(2n-1)\left(\omega_r t + \frac{\theta_1}{2}\right)\right] \quad (14)$$

It will be appreciated that the audio signal $E_3$ is a voltage consisting of all even harmonics (and no odd harmonics) of the rotor angular velocity $\omega_r$, including a static or direct current term, where the amplitude of each harmonic is given by the value of the Bessel function of appropriate order and magnitude. The complete spectral content of signal $E_3$ can readily be determined by referring to a table of Bessel functions and observing in the conventional manner the values of the Bessel function for each order ($\omega_r$ harmonic) versus the appropriate argument.

The signal $E_4$ is, on the other hand, a voltage consisting of all odd harmonics of $\omega_r$ (and no even harmonics) with no direct current term. The spectral content of signal $E_4$ can be derived similarly. For both $E_3$ and $E_4$, the argument of the Bessel function is a function of $\theta_1$, both arguments being $2m \sin \theta_1/2$. It is therefore to be recognized that signals $E_3$ and $E_4$ may be said to characterize functions of the shape of the effective antenna pattern to be synthesized and that they may therefore be appropriately modified to adjust the effective pattern shape and extent or to reduce or control its undesired side lobes. It will become apparent that signal $E_3$ is to a degree broadly analogous to the sum signal produced in a conventional monopulse radar receiver; it will therefore be spoken of in the following as the sum signal $E_3$. Signal $E_4$, consisting of only odd harmonics and having no direct current term, will be recognized as broadly analogous to the difference signal produced in a conventional monopulse radar receiver; accordingly, it will be identified in the following as the difference signal $E_4$.

As has been seen, the output sum signal $E_3$ derived from intermediate frequency phase detector 14 is coupled to filter 21. Filter 21, like filter 26 coupled to the output of intermediate frequency phase detector 13, has a significant role to play in permitting control of the effective antenna pattern characteristics.

For example, filter 21 may be a low pass filter that removes all alternating components from the sum signal $E_3$, signal $E_3$ being modified by it to form the modified sum signal $E_3'$.

$$E_3' = J_o(2m \sin \theta_1/2) \quad (15)$$

which signal may be rectified by rectifier 22 and applied as a residual signal to direct current meter or other utilization device 23. By way of example, the values of the Equation 15 function are plotted in relative dB versus the quantity x (or $\theta_1$) in FIG. 4 where $x$ is:

$$x = 2m \sin \theta_1/2 \quad (16)$$

The 3dB beam width b is about 3°, with the first side lobe 8 dB down. The effective sum pattern can be further modified by using additional terms, which is readily accomplished by tailoring filter 21 to pass one or more alternating components of sum signal $E_3$. For example, by opening additional pass bands in filter 21, the modified voltage $E_3'$ supplied to rectifier 22 can be:

$$E_3' = J_o(x) + 4/3 \, J_2(x) + 1/2 \, J_4(x) + 16/3 \, [J_6(x)/36 + \ldots + J_n/n^2] \quad (17)$$

where $n$ is even. FIG. 5, which is drawn similarly to FIG. 4, illustrates this rectified function for $n$ equals 20. While the approximately 3 dB beam width $b$ of FIG. 4 has now been increased to about 5.4°, the first symmetric side lobes of the effective receptivity pattern have been desirably dropped 25 dB with all other lobes being below 30 dB. FIG. 6 shows a polar plot in dB versus angle $\theta_1$ of the full 360° pattern for the condition expressed by Equation 17. It will be evident to those skilled in the art that further adjustment of the sum pattern and its side lobes may readily be accomplished by changing the characteristics of filter 21. It will be appreciated that such networks may be designed according to specifications established by the nature of the air craft, for example, and thus that a permanently fixed filter 21 may be developed having particularly tailored properties for use in a particular craft and for a particular kind of craft mission. It will also become apparent that in a particular craft one filter network may be found most suited for a particular mission, another for another mission, and so on. Thus, several such filter networks may be made available to the craft operator and he may select the one suitable to a particular mission by operation of conventional switching means.

Figure 7:
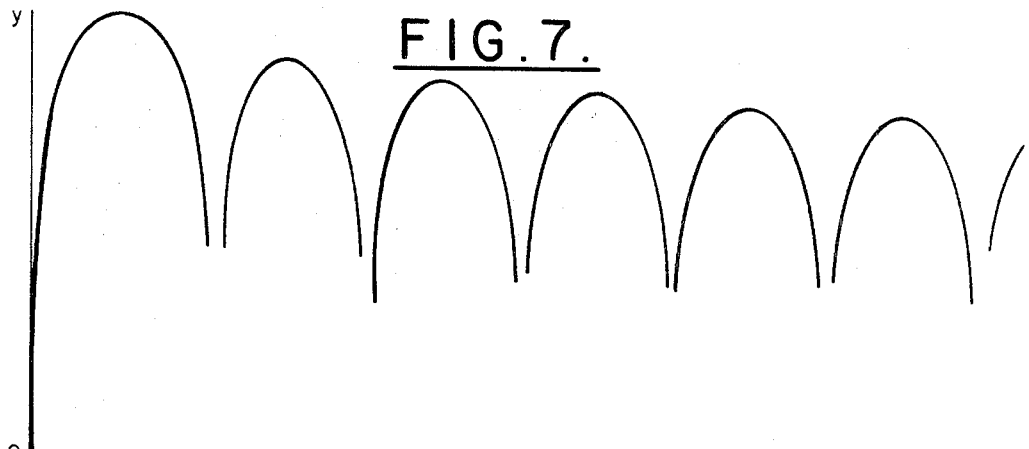
Figure 9:
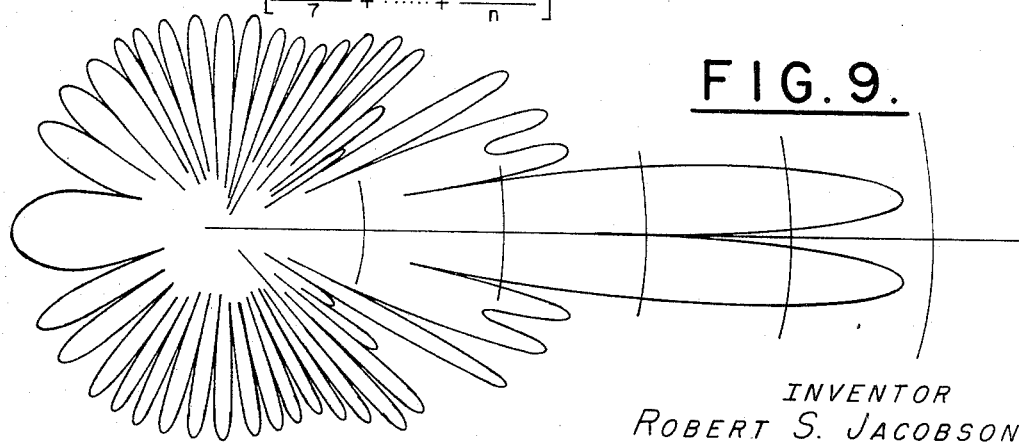

In a generally similar manner, filter 26 may be adjusted to present a desirable resultant signal to the first input of audio phase detector 27. If only the fundamental alternating component of the spectrum of difference voltage $E_4$ as suggested by Equation 14 is to be passed to phase detector 27, filter 26 is accordingly adjusted and the modified difference voltage $E_4'$ supplied to amplifier 37 then has the appearance of FIG. 7. Again, the function is plotted in FIG. 7 in relative dB versus the quantity $x$ as defined by equation 16. While the null at the origin is desirably sharp and deep, side lobe levels are relatively high for certain applications. However, if filter 26 is adjusted to pass certain additional alternating terms, the following modified difference voltage $E_4'$ may be derived.

$$E_4' = J_1(x) + 4/3 J_3(x) + [J_7(x)/7 + \ldots + J_n(x)/n] \quad (18)$$

where n is odd. FIG. 3 is a graph showing the consequent antenna pattern. The sharp zero degree null is retained, while the side lobe levels for the difference pattern are relatively lowered. FIG. 9 is a polar plot for the data covering a complete 360° azimuthal range. It will be evident to those skilled in the art that further adjustment of the difference pattern and its side lobes may readily be accomplished by changing the characteristics of filter 26. It will be appreciated that such filters may also be designed according to specifications established by the nature of air craft, for example, and thus that a permanently fixed filter 26 may be developed having particularly tailored properties for use in a particular craft and for a particular kind of craft mission. It will also be apparent that in a particular craft one filter network may be found most suited for use as filter 26 for a particular mission, another for another mission and so on. Thus, several such filters or networks may be made available to the craft operator and he may select the one suitable to a particular mission by operation of conventional switching means.

It will be recognized that the modified sum signal $E_3'$ is the type of signal useful, for example, in searching for and generally locating a broadcasting radio signal transmitter. Since signal $E_3'$ is always present when incoming signals are present, it indicates the actuality of the presence of the incoming signal even when the modified difference signal $E_4'$ is at its null or tracking value. Accordingly, the residual signal $E_3'$ may be used to operate meter 23 as a display of incoming signal strength, and therefore also to provide in the usual manner an indication of range to the transmitter. More important, it has a useful role in searching for a transmitter of unknown direction. With filter 21 adjusted to receive a wide sum pattern, the presence of incoming signals can be detected over a wide angular range. With successive incremented changes in the direction of flight of the vehicle, coupled with successive changes in filter 21 causing successive incrementally narrowing changes in the sum pattern, the direction of arrival of transmissions can be reasonably well determined to a degree sufficient that tracking can then be effectively instituted. In other words, bracketing of the transmitter direction is possible using display 23 only.

It will be further recognized that the modified difference or residual signal $E_4'$ is ideally suited for the purpose of precise tracking of the transmitter direction. Since it has a sharp null when the vehicle is tracking the broadcasting transmitter direction, the output of audio phase detector 27 and amplifier 37 is a bipolar control signal having a positive value, for example, for positive deviations of $\theta_1$, and a negative value for negative excursions thereof. This bipolar control voltage is fed by amplifier 37 through differential 35 and attenuator 39 via lead 43 to the local oscillator signal phase modulator 19, shifting the phase of the modulation in one sense for positive changes in $\theta_1$, and in the other for negative changes. The control voltage from amplifier 37 is first compared to the oscillating voltage from the rotor position pick off 33, so that only the tracking error voltage goes to control the phase modulator 19. Thus, the synthetic difference signal is used in a feed back loop to track the azimuth angle of the craft. In addition, the output of amplifier 37 is supplied directly to a meter 45 calibrated to cover the 360° azimuthal scale. Thus, the vehicle operator may read azimuth angle with respect to a remote transmitter directly from meter 45. Alternatively, he may cause the same output of amplifier 37 to operate the azimuth channel of an automatic pilot. In either event, the introduction of compass signals from compass 29 into the loop advantageously reduces tracking rate requirements to a low value in view of the stabilizing effect of the compass data.

The basic apparatus described in connection with FIG. 2 performs its role with good accuracy on the assumption that the elevation angle $\phi$ of the air craft 53 with respect to the location of the broadcasting transmitter R shown in FIG. 20 is relatively small and that the angle subtended by the rotor 52 (FIG. 3) is relatively small as viewed from the transmitter location (or that the air craft range r is large compared to the rotor diameter d). If the air craft 53 is at a large value of range r, but the craft is elevated so that $\phi$ in FIG. 20 is no longer small, then the amount of Doppler modulation will be reduced in proportion to $\cos \phi$. If $m_1$ is the modulation index (as previously defined by Equations 3 and 4) at a low value of craft altitude $h$, and $m_2$ is the modulation index at an elevated angle $\phi$, then $$m_2 = m_1 \cos \phi$$

Accordingly, for high values of elevation angle $\phi$, accuracy of operation of the system of FIG. 2 will tend to degrade. Such is not in practice a serious difficulty of the system of FIG. 2, as high azimuth accuracy is of most consequence generally for relatively lower values of elevation angle $\phi$.

It is a function of the automatically controlled attenuator 39 of FIG. 2 driven by the $E_3'$ error signal from phase detector 24 to provide the desired compensating effect. Since the compensating voltage is representative of elevation angle $\phi$, the signal may also be presented on the electrical meter 41, thus displaying craft elevation angle with respect to the broadcasting transmitter.

While implementation of filters 21 and 26 of FIG. 2 may be accomplished in several ways using substantially conventional filter components, representative novel filter configurations will now be presented. As to filter 21, its role has been discussed above in connection with the derivation of Equation 15 expressing the value of signal $E_3'$, an audio voltage consisting of all even harmonics (and no odd harmonics) of the rotor angular speed $\omega_r$, including a direct current component:

$$E_3' = J_o(2m \sin \theta_1/2) \quad (15)$$

Because of the nature of the spectrum of the voltage $E_3'$, a filter 21 is required that attenuates all components, for instance, at 10 Hz and higher, such as the simple single section R-C filter of FIG. 10 may accomplish. The time constant of the filter 21 must not be excessive, for instance, because of the undesired effect of excessive lag or distance indicator 23 or on any control device operated by the output of filter 21. Excessively delayed signals applied to indicator 23 would undesirably limit the speed with which a search operation may be accomplished. For example, a filter like that of FIG. 10 with R = 10,000 ohms and C = 25 microfarads yields a reasonable delay and attenuates the 10 Hz signal by 24 dB. Such a filter will produce the results specified by the graph of FIG. 4 within substantially 6 per cent, for example.

As previously observed, the graph of FIG. 4 discloses the presence of significant levels of energy in the antenna receptivity pattern side lobes. A preferred filter 21 may therefore be one that yields graphs such as those of FIGS. 5 and 6, which graphs represent the law established by Equation 17 with a value of n sufficiently large that the error in predicting amplitude of high order side lobes is negligible. For this purpose, the value $n=20$ has been found practical for certain applications. It will be readily apparent to those skilled in the art that well known computational methods may be employed to translate the coefficients of the respective Bessel function orders of equation 17 into decibel values, as presented in Table 1.

TABLE 1

| Column | 2 | 3 | 4 | 5 | 6 |
|---|---|---|---|---|---|
| | Network Response, dB | | | dB | |
| Frequency Hz | Net.50 | Net.51 | Sum 50+51 | Req'd Response | dB Error |
| 0 (d.c.) | 0.0 | 0.0 | 0.0 | 0.0 | 0.0 |
| 10 | + 8.2 | − 5.2 | + 3.0 | + 2.5 | + 0.5 |
| 20 | + 3.7 | −10.1 | − 6.4 | − 6.0 | − 0.4 |
| 30 | − 2.6 | −13.5 | −16.1 | −16.6 | + 0.5 |
| 40 | − 5.8 | −15.9 | −21.7 | −21.6 | − 0.1 |
| 50 | − 7.2 | −17.7 | −24.9 | −25.5 | + 0.6 |
| 60 | − 8.8 | −19.3 | −28.1 | −28.6 | + 0.5 |
| 70 | −10.1 | −20.6 | −30.7 | −31.3 | + 0.6 |
| 80 | −11.3 | −21.8 | −33.1 | −33.6 | + 0.5 |
| 90 | −12.3 | −22.8 | −35.1 | −35.7 | + 0.6 |
| 100 | −13.2 | −23.7 | −36.9 | −37.5 | + 0.6 |

The required response of filter 21 is thus tabulated in Column 5 of Table 1. For instance, the direct current term $J_o$ is unity, requiring a zero B response; the second harmonic $J_2$ at 10 Hz requires voltage amplification of +2.5 dB; the fourth harmonic requires attenuation of −6 dB, and so on. These values appear in curve 101 of FIG. 11 as the desired total response of filter network 21 according to Equation 17, higher order frequency components decreasing in amplitude substantially as the square of frequency.

FIGS. 11 and 12 illustrate how suitable amplifier-filter networks 50 and 51 may be cascaded to yield the composite desired filter characteristic 101. For example, network 50 comprises a conventional resistor (52) input voltage amplifier 53 with capacitor 54 and resistor (55)-inductance (56) feed back paths. As is well understood, the values of $C_1$, R, and $L_1$ of the respective feed back elements 54, 55, and 56 may be chosen to give a peaked frequency response as plotted in graph 50a of FIG. 11.

The associated network 51 comprises an input resistor 57 coupled to the output of amplifier 53 and an amplifier 58 with parallel feed back paths through capacitor 59 and resistor 60. As is well known, the values $C_2$ and R of the respective elements 59 and 60 may readily be selected to give the simple falling response represented by curve 51a of FIG. 11. It is readily apparent that the total response of networks 50 and 51 may be adjusted to fall substantially on curve 101. It may be observed from Table 1 that the individual responses of networks 50 and 51, respectively tabulated in Columns 2 and 3, yield the total response tabulated in Column 4. The latter values, when compared to the desired response shown in Column 5, show only the small error of Column 6, the error in side lobe level being only 0.6 dB or better at the important lower harmonics. Typical of the values of the feed back circuit elements which may be used are:

R = 500 ohms
$L_1$ = 10 henrys,
$C_1$ = 15.6 microfarads, and
$C_2$ = 49.0 microfarads.

These values may be scaled or changed to other values as long as the time constants of the network circuits are appropriately low.

In the foregoing, it is understood that rectifier 22 is an ordinary rectifier or amplitude modulation detector whose characteristics are substantially independent of frequency. Accordingly, such minor frequency variational characteristics may be ignored in specifying the characteristics of filter 21. The problems associated with the design of the filter 26 are more complex to the extent that the audio phase detector 27 does in fact have amplitude characteristics that depend upon frequency. Phase detector 27 is a conventional circuit that will detect any input component of fundamental frequency at its full amplitude, but harmonics are detected with an amplitude inversely proportional to their harmonic numbers. Thus, as in Column 4 of Table 2, the 15 Hz component will drop in amplitude, because of phase detector 27, by −9.6 dB, the fifth harmonic is down by −14 dB, and so on, providing a response generally inversely proportional to input frequency or harmonic number.

TABLE 2

| 1 | 2 | 3 | 4 | 5 |
|---|---|---|---|---|
| Harmonic Number | Freq. Hz | dB Req'd Response | Phase Det. 27 Response | dB Desired Network Response |
| 1 | 5 | 0 | 0 | 0 |
| 3 | 15 | + 2.5 | − 9.6 | +12.1 |
| 5 | 25 | −∞ | −14 | −∞ |
| 7 | 35 | −16.9 | −16.9 | 0 |
| 9 | 45 | −19.1 | −19.1 | 0 |
| 11 | 55 | −20.8 | −20.8 | 0 |
| 13 | 65 | −22.3 | −22.3 | 0 |
| 15 | 75 | −23.5 | −23.5 | 0 |
| 17 | 85 | −24.6 | −24.6 | 0 |
| 19 | 95 | −25.6 | −25.6 | 0 |

With a phase detector 27 having the above discussed characteristics, a filter 26 like that of FIG. 10 may be cascaded with it. By doing so, the third harmonic is, for example, cut by an additional −9.5 dB, the fifth harmonic by an additional −14 dB, and so on, producing a total response of −19 dB for the third harmonic, −28 dB for the fifth harmonic, and so on. Thus, sufficient filtering of high order harmonics results in achieving the desirable characteristics represented in the graph of FIG. 7.

Figure 8:
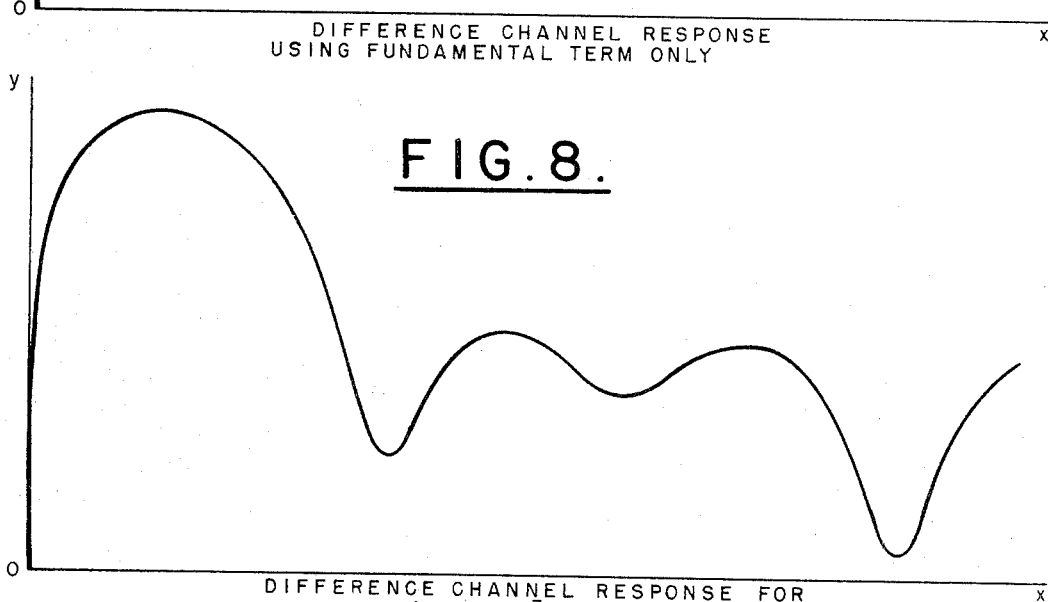

However, FIG. 7 again shows the existence of antenna pattern side lobes having substantial energy levels, and a preferred arrangement may be evolved by reference to Equation 18 for the signal $E_4'$ for use in producing a response such as illustrated in the graphs of FIGS. 8 and 9 wherein side lobes are relatively subdued. For provoking the desired response, it is required that the fundamental $J_1$ be detected by detector 27 so as to appear in its output at full amplitude and the third harmonic at +2.5 dB; there is no fifth harmonic output and higher components are to appear in inverse proportion to their harmonic number. Table 2 lists the harmonic number (column 1), the corresponding frequency in Hz (column 2), and the required over-all response (column 3). Column 4, as noted above, tabulates the response of phase detector 27 in dB. The difference between the values of columns 3 and 4 is desired network response for filter 26 and is tabulated in column 5.

Figure 13:
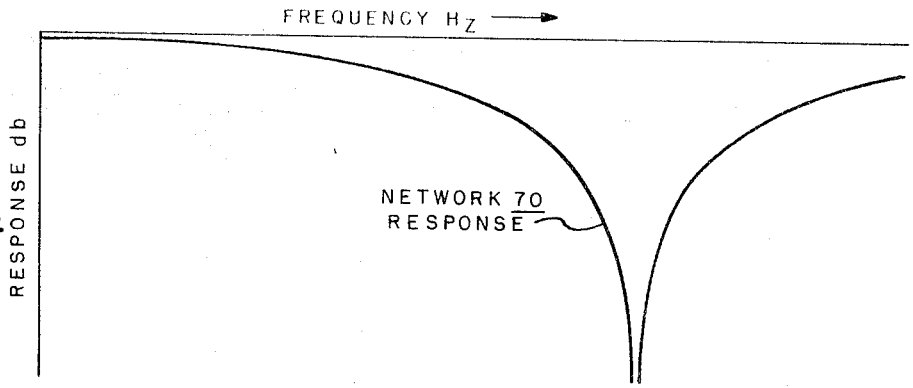
FIGS. 13 to 16 are graphs showing desired characteristics of an additional filter.
Figure 17:
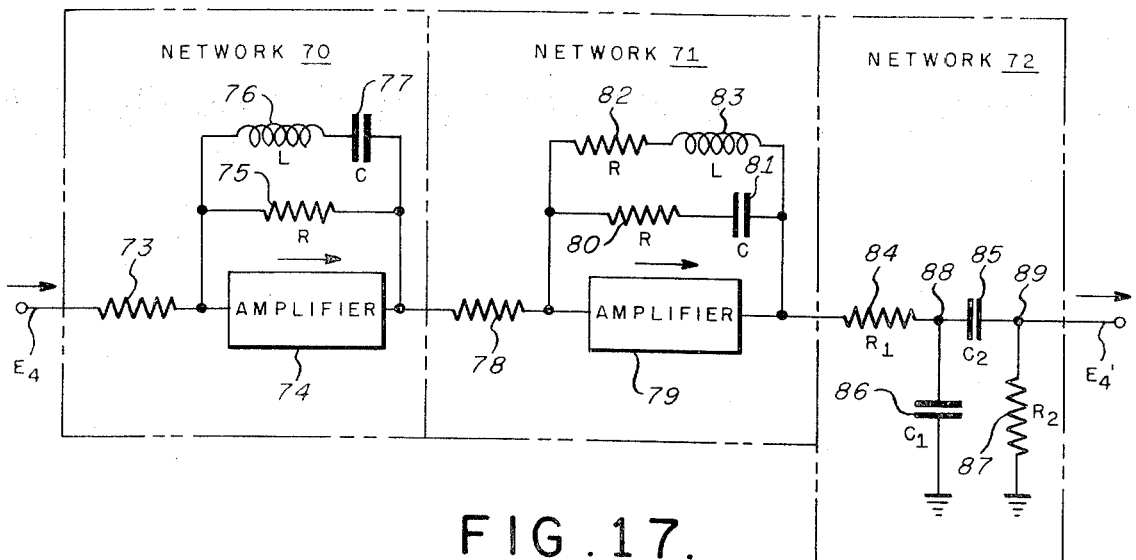
FIG. 17 is a circuit diagram of a difference channel filter for use in the system of FIG. 2.

The composite filter network 26 is illustrated in one possible form in FIG. 17. In order to inject the response specified by FIG. 13, amplifier-network 70 is used for completely rejecting the fifth harmonic at 25 Hz as required because there is no $J_5$ term in equation 18. Network 70 is composed of input resistor 73 feeding a conventional amplifier 74 having two feed back paths. One feed back path is purely resistive, being made up of resistor 75. The second feed back path is made up of inductance 76 and capacitor 77 connected in series. The respective elements of the feed back paths may, for example, have the following values:

R = 20,000 ohms,
L = 31.8 henrys, and
C = 1.27 microfarads.

Figure 14:
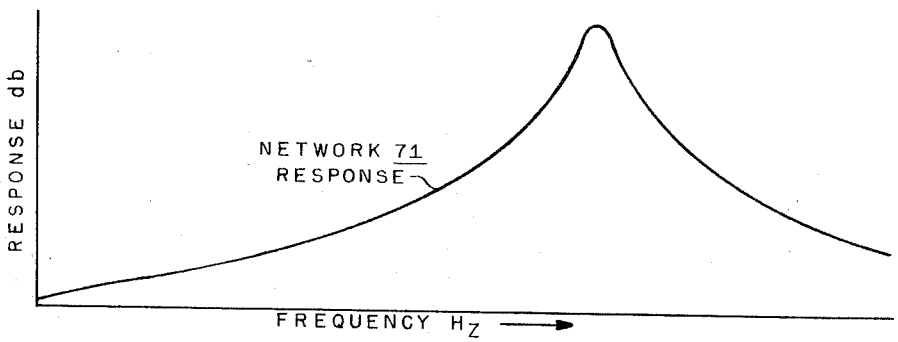

The second component of filter network 27 is the amplifier-filter network 71, which has an input resistor 78 coupled to the output of amplifier 74 and its own amplifier 79 around which two parallel feed back paths are provided. The first feed back path has a resistor 80 and a capacitor 81 connected in series, while the second feed back path has a resistor 82 and an inductor 83 in series relation. The response characteristic of the graph of FIG. 13 attributed to network 70 has also attenuated components other than the desired 25 Hz component to various degrees; accordingly, network 71 is arranged as specified by the curve of FIG. 14 to add a peaked response centered substantially at 20 Hz to bring back up the undesirably attenuated components and particularly to supply amplification at 15 Hz. In network 71, the feed back elements may, for instance, have the following values:

R = 200 ohms
L = 40 henrys and
C = 1.6 microfarads.

Figure 15:
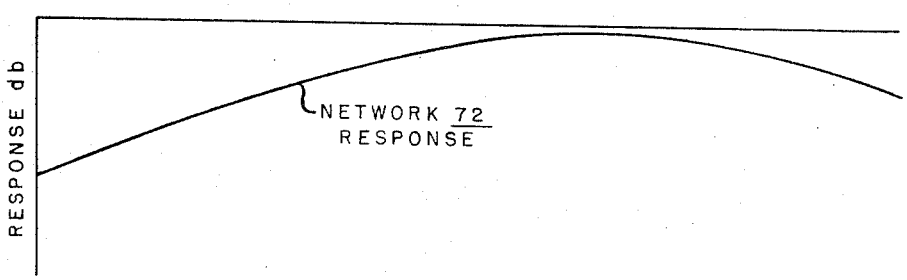

If networks 70 and 71 do not cooperate to yield substantially the desired results, a conventional passive network like network 72 may be added for the purpose. Network 72 has the characteristic specified in FIG. 15 and has a series of elements connected to the output of amplifier 79 including resistor 84, junction 88, capacitor 85, and output junction 89. Junction 88 is coupled to ground via capacitor 86, while the output junction 89 is coupled to ground by resistor 87. The circuit elements of network 72 may have the following parametric values, by way of example:

$R_1$ = 1,000 ohms,
$R_2$ = 100,000 ohms,
$C_1$ 32 3.2 microfarads, and
$C_2$ = 0.2 microfarads.

Figure 16:
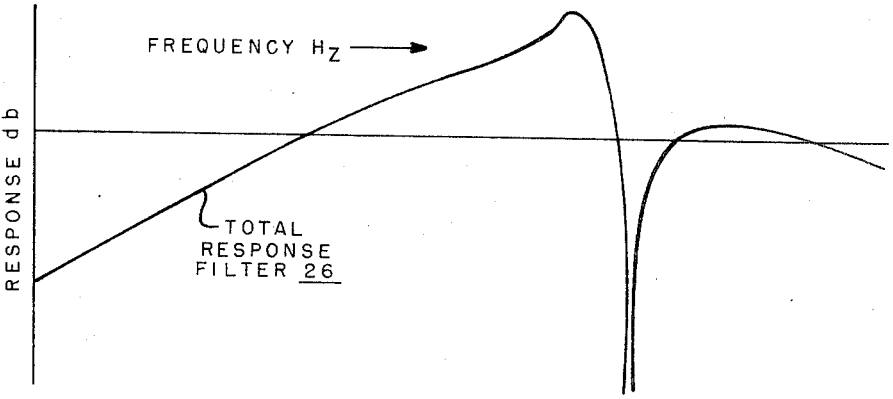

Calculation will reveal that the time constants of the circuits of networks 70, 71, and 72 are all of the order of $10^{-2}$ to $10^{-3}$ seconds, so that they introduce no substantial lags in the composite signal as represented by FIG. 16 being supplied by filter 26 and phase detector 27 to utilization equipment, such as a display 45 (FIG. 2) or a flight control servo. Comparison of Table 2 values with the curve of FIG. 16 assures that substantially the desired signal has been generated at the output of phase detector 27.

In FIG. 2, the compass 29 has been supplied as an aid in inertially stabilizing operation of the novel direction finding system. The alternative stabilization system of FIG. 18 may be used, for example, during hovering operations of the air craft. In such circumstances, it is desired that the azimuth angle output signal appearing on terminal 100 and supplied by the phase detector 27 of FIG. 2 through amplifier 37 be referred to the air craft fore-aft and right-left axes, since these are the axes over which the operating pilot has control. On the other hand, the plane of the helicopter rotor 52 will not necessarily be horizontal, especially in a cross-wind situation, so that compensation for lack of horizontality must also be sought.

In FIG. 19, helicopter rotor 52 is schematically shown in an elevation view at an angle tilted in roll with respect to the horizon and is considered to be in the general vicinity of a radio transmitter system R, such as a transmitter located on the ground plane R-G. The rotor 52 is represented by the line between blade tips 50, 50' and is rotated about point C at its hub 54 as in FIG. 3. The line C-S is coincident with the rotor drive and is perpendicular to line 50—50'. The point G is vertically below point C, while R represents the position of the radio transmitter. According to an embodiment of the invention, a measure of the angle a defined by points Z, R, and C, where Z is the zenith, is used as a control signal; it is seen that if angle a is driven to zero, the air craft 53 will then be hovering directly over the location of radio transmitter R regardless of the roll tilt of the helicopter rotor plane. Now $\cos b = \sin f$. Also, the expected values of angles a and f are small; accordingly, $\sin f \cong f$. The angle d is simply the roll output of a vertical gyro normally available in the craft and angle c equals angle f minus angle d. But angle c equals a because line RZ is parallel to line CG. Therefore, angle $a = \cos b - $ angle $d$. Thus, the hover roll angle may be obtained simply by subtracting the vertical gyro roll output from the output of phase detector 24 of FIG. 2. FIG. 19 actually represents only a simplification of the real case in which the tilt of the rotor system has both roll and pitch components. It is observed that FIG. 19 and the discussion pending upon it may be used in a corresponding way to discuss the analogous problem associated with pitch of the craft.

Figure 18:
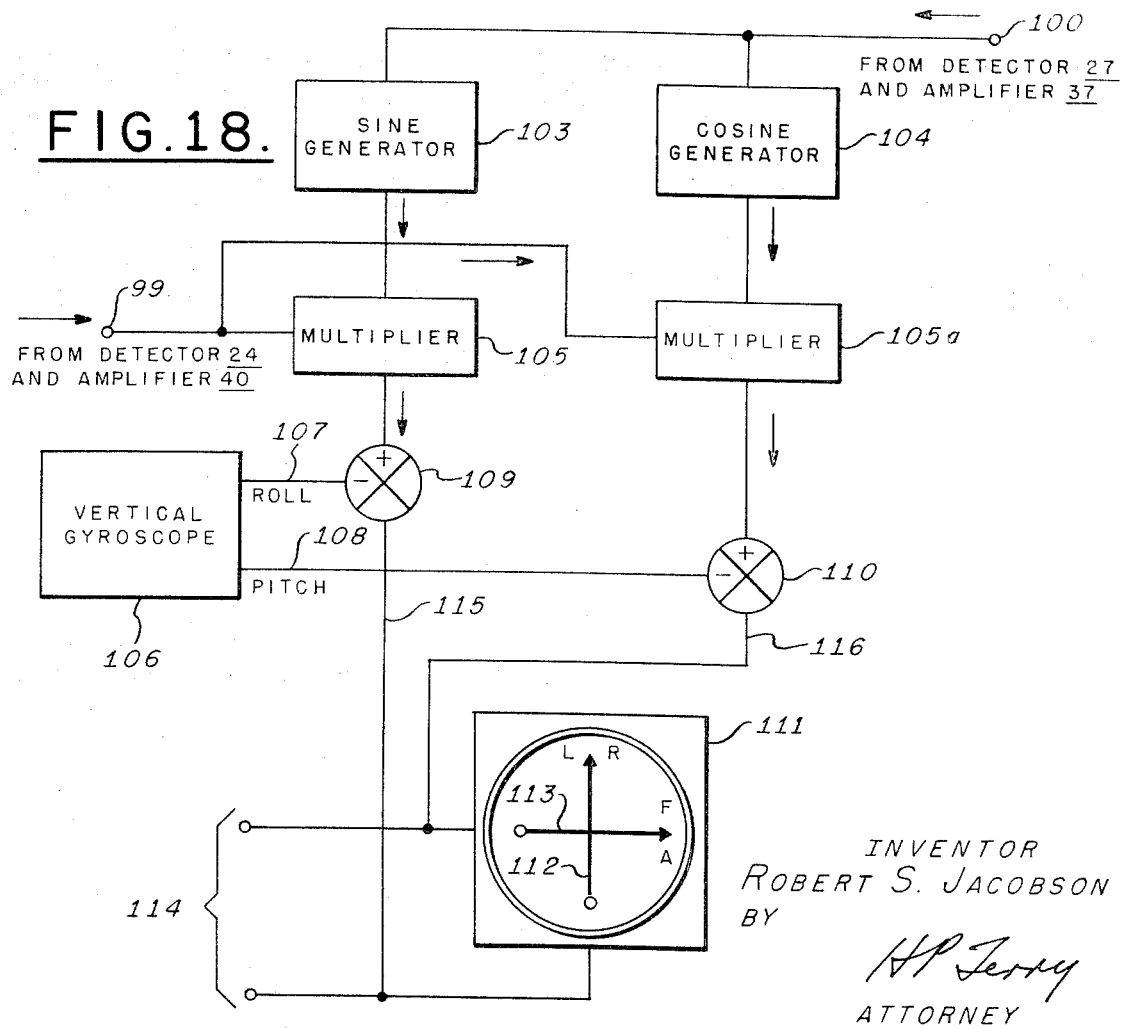
FIG. 18 is a block diagram of an alternative arrangement for use in part of the system of FIG. 2.

For complete stabilization, the apparatus of FIG. 18 is employed in the hover mode of the air craft 53. The azimuth angle output signal appearing on terminal 100 generated by phase detector 27 and passed through amplifier 37 (FIG. 2) is supplied to a conventional sine generator 103 and to a conventional cosine generator 104. Elements 103 and 104 may be provided by a conventional unitary resolver. The trigonometric functions produced in generators 103 and 104 are respectively coupled to first inputs of multiplier 105 and of multiplier 105a. The second inputs of multipliers 105 and 105a are supplied with the output of detector 24 after passage through amplifier 40 of FIG. 2 to terminal 99 of FIG. 18.

The vertical gyroscope 106 has internal roll and pitch pick offs (not shown) for providing a roll angle signal on lead 107 and a pitch angle signal on lead 108 in the conventional manner. The roll signal on lead 107 is subtracted in the algebraic adder 109 from the output of multiplier 105. In a generally similar manner, the pitch signal on lead 108 is subtracted in the algebraic adder 110 from the output of multiplier 105a. A conventional crossed-pointer meter 111 is used to display the left-right error signal on electrical meter 112 generated on lead 115 by adder 109 and also to display for navigation purposes the fore-aft error signal on electrical meter 113 generated on lead 116 by adder 110.

In operation, the values of cos a and of the craft rotor position angle $\theta_1$, as defined by rotor blade pick off 33, are available ($\theta_1$ is referred to the coordinates of the craft and is therefore zero straight ahead). From $\theta_1$, $\sin \theta_1$, and $\cos \theta_1$ are generated. Multiplication of cos a by $\sin \theta_1$ yields the component of the angle $f$ in the craft left-right direction; multiplication of cos a by $\cos \theta_1$ yields the component of angle $f$ in the craft fore-aft direction. The next manipulation transfers from craft axes to earth axes and is to subtract the craft roll angle on lead 107 from $f \sin \theta_1$ and the craft pitch angle on lead 108 from $f \cos \theta_1$ to yield two coordinates expressing in angular terms the error of point C of FIG. 18 with respect to line RZ. These signals are directly displayed by crossed-pointer meter 111 or by standard types of cathode ray or other indicators. The signals on leads 115 and 116 may be used also or alternatively for the purpose of control of a conventional automatic pilot when connected, for instance, to terminals 114.

As has been noted in the foregoing discussion, the invention may be employed with benefit in quasi-Doppler direction finders as well as in the moving antenna type of wide aperture Doppler system. As will be apparent to those skilled in the art, a circular array of antenna elements may be used in place of the single moving antenna element 2, only one such element being connected to mixer 11 at any one instant of time. As is well understood in the prior art, a rotary commutator or switch arm is then arranged to rotate at speed $\omega_r$, thus successively making contact to the successive antenna elements of the circular array. Rotor angle pick off 33 of FIG. 2 is driven in synchronism with the rotating commutator arm.

It will be understood that the invention provides means in a wide aperture Doppler kind of radio direction finding equipment for locating the azimuth and elevation directions of a broadcasting radio transmitter, as well as for providing a measure of its range relative to the direction finding receiver. The invention provides means in wide aperture types of Doppler direction finders for employing relatively small receiver antenna elements and for processing these signals for providing enhanced accuracy of determination of the angles of arrival of the radio signals. The adjustable filter network signal processing apparatus of the invention permits the effective synthesis of various sum and difference antenna receptivity patterns particularly adapted for use according to selected modes of operation of the system and to the associated mission of the craft. Control or suppression of undesired side lobe levels of the synthesized patterns is afforded, as well as the precise shaping of the desired lobes of the receptivity pattern.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Apparatus for determining the direction of arrival of a radio frequency carrier wave comprising:
   first receiver means for receiving a phase modulated version of said carrier wave,
   generator means for deriving solely from said first receiver means a phase reference signal having a characteristic frequency,
   second receiver means for directly receiving said carrier wave,
   intermediate frequency phase detector means responsive to said first and second receiver means,
   audio frequency phase detector means responsive to said intermediate frequency phase detector means and to said generator means, and
   utilization apparatus responsive to said audio frequency phase detector means.

2. Apparatus for determining the direction of arrival of a radio frequency carrier wave comprising:
   first receiver means for receiving a phase modulated version of said carrier wave,
   generator means for deriving solely from said first receiver means a phase reference signal having a characteristic frequency,
   second receiver means for directly receiving said carrier wave,
   local oscillator means for supplying local oscillator signals to said first and second receiver means,
   intermediate frequency phase detector means responsive to said first and second receiver means,
   audio frequency phase detector means responsive to said intermediate frequency phase detector means and to said generator means,
   phase modulator means responsive to said audio frequency phase detector means and to said generator means for phase modulating said local oscillator signal supplied to said first receiving means, and
   utilization apparatus phase detector means.

3. Apparatus as described in claim 2 additionally including:
   quadrature phase detector means responsive to said first and second receiver means, and
   variable attenuator means coupled between said signal generator means and said phase modulator means, said variable attenuator means being responsive to the output of said quadrature phase detector means.

4. Apparatus for determining the direction of arrival of a radio frequency carrier wave comprising:
   first receiver means for receiving a phase modulated version of said carrier wave,
   generator means for deriving from said first receiver means a phase reference signal having a characteristic frequency,
   second receiver means for receiving said carrier wave, first phase detector means responsive to said first and second receiver means,
   second phase detector means responsive to said first phase detector means and to said generator means,
   local oscillator means for supplying local oscillator signals to said first and second receiver means,
   phase modulator means responsive to said second phase detector means and to said generator means for phase modulating said local oscillator signal supplied to said first receiver means,
   quadrature phase detector means responsive to said first and second receiver means,
   even harmonic filter means responsive to an output of said quadrature phase detector means,
      said output comprising a direct current component and additional components representing a plurality of even harmonics of said frequency of said phase reference signal,
      said filter means permitting selective alteration of predetermined ones of said plurality of even harmonics for generating a residual output, and
   means for utilizing said residual output.

5. Apparatus as described in claim 4 wherein said means for utilization of said residual output of said even harmonic filter means comprises:
   rectifier means responsive to said even harmonic filter means for producing a rectified residual output signal, and
   display means responsive to said rectified residual output signal.

6. Apparatus as described in claim 4 wherein said even harmonics filter means comprises low pass filter means for providing an output voltage E of amplitude expressed substantially by the equation:

$$E = J_o(2m \sin \theta_1/2)$$

where:
   $J_o$ = a Bessel function of zero order,
   $m$ = the index of modulation of said carrier wave by said first receiver means, and
   $\theta_1$ = the azimuth direction of arrival of said carrier signal.

7. Apparatus as described in claim 4 wherein said even harmonic filter means is characterized by means for providing an output voltage E of amplitude expressed substantially by the equation:

$$E = J_o(x) - 4/3 J_2(x) + 1/2 J_4(x) + 16/3 \ [J_6(x)/36 + \ldots + J_n/n^2]$$

where:
   $x = (2m \sin \theta_1/2)$ or the argument of each Bessel function term,
   $m$ = the index of modulation of said carrier signal by said first receiver means,
   $\theta_1$ = the direction of arrival of said carrier signal, and
   $n$ = even integers providing $J_n/n^2$ terms for the range of values of $n$ including all even integral values of n above 8 to an even integer of value less than 22.

8. Apparatus as described in claim 4 wherein:
   said even harmonic filter means comprises first and second filter circuit means connected in series relation,
   said first filter circuit means comprises first amplifier means having capacitive feed back means and inductive feed back means in parallel relation, and
   said second filter circuit means comprises second amplifier means having capacitive feed back means.

9. Apparatus for determining the direction of arrival of a radio frequency carrier wave comprising:
   first receiver means for receiving a phase modulated version of said carrier wave,
   generator means for deriving from said first receiver means a phase reference signal having a characteristic frequency,
   second receiver means for receiving said carrier wave,
   quadrature phase detector means responsive to said first and second receiver means for producing an output signal having components represented by a plurality of odd harmonics of said signal generator means frequency, odd harmonic filter means permitting selective alteration of predetermined ones of said plurality of odd harmonics for generating a residual output, and utilization means responsive to said residual output.

10. Apparatus as described in claim 9 comprising:

local oscillator means for supplying local oscillator signals to said first and second receiver means, and phase modulator means responsive to said generator means for phase modulating said local oscillator signal supplied to said first receiver means.

11. Apparatus as described in claim 10 wherein said utilization means responsive to said odd harmonic filter means comprises audio phase detector means also responsive to said signal generator means for producing a bipolar control signal.

12. Apparatus as described in claim 11 additionally including flight control servo means responsive to said bipolar control signal.

13. Apparatus as described in claim 11 additionally including means for algebraically summing said bipolar control signal and said phase reference signal for supply to said local oscillator phase modulating means.

14. Apparatus as described in claim 11 additionally including display means responsive to said bipolar control signal for displaying the azimuth angle of arrival of said carrier signal.

15. Apparatus as described in claim 11 wherein said odd harmonic filter means and said audio phase detector means have a composite characteristic adapted for producing an output voltage E of amplitude expressed substantially by the equation:

$$E = J_1(2m \sin \theta_1/2)$$

where:

$J_1$ = a Bessel function of the first order, m = the index of modulation of said carrier wave by said first receiver means, and $\theta_1$ = the azimuth direction of arrival of said carrier signal.

16. Apparatus as described in claim 11 wherein said odd harmonic filter means and said audio phase detector means have a composite characteristic adapted for producing an output voltage E of amplitude substantially expressed by the equation:

$$E = J_1(x) - 4/3\, J_3(x) + [J_7(x)/7 + \ldots + J_n(x)/n]$$

where:

$x$ = $(2m \sin \theta_1/2)$ or the argument of each Bessel function term, m = the index of modulation of said carrier signal by said first receiver means, $\theta_1$ = the direction of arrival of said carrier signal, and n = odd integers providing $J_n(x)/n$ terms for the range of values of n including all odd integral values of n above 7 to an odd integer of value less than 21.

17. Apparatus as described in claim 10 wherein:

said odd harmonic filter means comprises first, second and third filter circuit means in series relation, said first filter circuit means comprises first amplifier means having feed back means including capacitive and inductive means in series relation, said second filter circuit means comprises second amplifier means having capacitive feed back means in parallel relation with feed back means including inductive means, and said third filter circuit means comprises passive filter means.

18. Apparatus for determining the direction of arrival of a radio frequency carrier wave comprising:

first receiver means for receiving a phase modulated version of said carrier wave, generator means for deriving from said first receiver means a phase reference signal having a characteristic frequency, second receiver means for receiving said carrier wave first phase detector means responsive to said first and second receiver means, second phase detector means responsive to said first phase detector means and to said generator means, local oscillator means for supplying local oscillator signals to said first and second receiver means, phase modulator means responsive to said second phase detector means and to said generator means for phase modulating said local oscillator signal supplied to said first receiver means, odd harmonic filter means responsive to an output of said first phase detector means, said output comprising components representing a plurality of odd harmonics of said frequency of said phase reference signal, said filter means permitting selective alteration of predetermined ones of said plurality of odd harmonics for generating a first residual output, utilization means responsive to said first residual output, quadrature phase detector means responsive to said first and second receiver means for producing an output signal having components represented by a plurality of even harmonics of said signal generator frequency, even harmonic filter means permitting selective alteration of predetermined ones of said plurality of even harmonics for generating a second residual output, and utilization means responsive to said second residual output.

19. Apparatus as described in claim 18 wherein said utilization means responsive to said odd harmonic filter means first residual output includes display means for displaying the azimuth angle of arrival of said carrier signal.

20. Apparatus as described in claim 18 wherein said utilization means responsive to said odd harmonic filter means first residual output includes flight control servo means.

21. Apparatus as described in claim 18 wherein said means utilizing said second residual output of said even harmonic filter means comprises display means for displaying the elevation angle of arrival of said carrier signal.

22. Apparatus as described in claim 18 wherein:

said second phase detector means is responsive to said first phase detector means and to said signal generator means, and said utilization means responsive to said odd harmonic filter means comprises audio phase detector means also responsive to said signal generator means.

23. Apparatus as described in claim 22 comprising:

sine generator means responsive to said audio phase detector means, first multiplier means responsive to said sine generator means and to said quadrature phase detector means for producing a first product signal, and first display means responsive to said first product signal.

24. Apparatus as described in claim 23 including:

vertical reference means for supplying a roll angle output, and first algebraic adder means between said first multiplier means and said first display means responsive to said first product signal.

25. Apparatus as described in claim 22 comprising:

cosine generator means responsive to said audio phase detector means, second multiplier means responsive to said cosine generator means and to said quadrature phase detector means for producing a second product signal, and second display means responsive to said second product signal.

26. Apparatus as described in claim 25 including:

vertical reference means for supplying a pitch angle output, and second algebraic means between said second multiplier means and said second display means responsive to said second product signal.

27. Apparatus for determining the direction of arrival of a radio frequency carrier signal comprising:

first carrier wave receiver means including motive means for effectively rotating said carrier wave receiver means about a center of revolution at a predetermined rate for imposing a phase modulation on said carrier wave, signal generator means for producing a reference signal of frequency proportional to said rate, second receiver means spaced in fixed relation with respect to said center of revolution for receiving said carrier wave, first phase detector means responsive to said first and second receiver means and to said signal generator means for producing a signal related to the azimuth angle of arrival of said carrier wave, and second phase detector means responsive to said first and second receiver means and to said signal generator means for producing a signal related to the elevation angle of arrival of said carrier wave.

28. Apparatus as described in claim 27 further including:

means for generating a sine function signal from said signal related to said azimuth angle of arrival of said carrier wave, means for multiplying said sine function signal by said elevation related signal for generating a right-left tracking error signal, and utilization means responsive to said means for multiplying said sine function by said elevation related signals.

29. Apparatus as described in claim 28 further including:

means for generating a cosine function signal from said signal related to said elevation angle of arrival of said carrier wave, means for multiplying said cosine function signal by said elevation related signal for generating a forward-rearward tracking error signal, and utilization means responsive to said means for multiplying said cosine function by said elevation related signal.

30. Apparatus for determining the direction of arrival of a radio frequency carrier wave comprising first receiver means for receiving a phase modulated version of said carrier wave, generator means for deriving from said first receiver means a phase reference signal having a characteristic frequency, second receiver means for receiving said carrier wave, first phase detector means responsive to said first and second receiver means, second phase detector means responsive to said first phase detector means and to said generator means, quadrature phase detector means responsive to said first and second receiver means, local oscillator means for supplying local oscillator signals to said first and second receiver means, phase modulator means responsive to said second phase detector means and to said generator means for phase modulating said local oscillator signal supplied to said first receiver means, variable attenuator means coupled between said signal generator means and said phase modulator means, said variable attenuator means being responsive to the output of said second phase detector means, and display means responsive to said second phase detector means for displaying the elevation angle of arrival of said carrier signal.

* * * * *